United States Patent
Park et al.

(10) Patent No.: US 10,935,715 B2
(45) Date of Patent: Mar. 2, 2021

(54) DISPLAY DEVICE

(71) Applicant: Samsung Display Co., Ltd., Yongin-si (KR)

(72) Inventors: Keunwoo Park, Incheon (KR); Donggil Son, Seoul (KR); Hongbeom Lee, Hwaseong-si (KR); Taewoo Lim, Yongin-si (KR); Dongwoo Kim, Seoul (KR); Minsu Kim, Hwaseong-si (KR); Seongyeon Lee, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/351,244

(22) Filed: Mar. 12, 2019

(65) Prior Publication Data
US 2019/0324192 A1 Oct. 24, 2019

(30) Foreign Application Priority Data
Apr. 23, 2018 (KR) .................. 10-2018-0046604

(51) Int. Cl.
*G02B 6/00* (2006.01)
*F21V 8/00* (2006.01)

(52) U.S. Cl.
CPC ......... *G02B 6/0076* (2013.01); *G02B 6/0036* (2013.01); *G02B 6/0088* (2013.01)

(58) Field of Classification Search
CPC ............................ G02B 6/0036; G02B 6/0076
USPC ........................................................ 362/606
See application file for complete search history.

(56) References Cited

U.S. PATENT DOCUMENTS

| 8,506,149 B2 | 8/2013 | Kim et al. |
| 9,879,836 B2 * | 1/2018 | Kleiner ................. F21S 41/24 |
| 9,995,963 B2 | 6/2018 | Park et al. |
| 2006/0083021 A1 * | 4/2006 | Jeong ................. G02B 6/0021 362/561 |
| 2008/0101088 A1 | 5/2008 | Kim et al. |
| 2009/0185389 A1 * | 7/2009 | Tessnow .............. G02B 6/0038 362/516 |
| 2009/0190072 A1 * | 7/2009 | Nagata ................ G02B 6/0028 349/96 |
| 2011/0227487 A1 * | 9/2011 | Nichol ................ G02B 6/0018 315/158 |

(Continued)

FOREIGN PATENT DOCUMENTS

| KR | 10-0862667 B1 | 10/2008 |
| KR | 10-0980068 B1 | 9/2010 |
| KR | 10-2017-0044790 A | 4/2017 |

*Primary Examiner* — Christopher M Raabe
(74) *Attorney, Agent, or Firm* — Lewis Roca Rothgerber Christie LLP

(57) ABSTRACT

A display device includes: a first light guide plate and a display panel disposed along a first direction; a second light guide plate between the first light guide plate and the display panel to be spaced apart from the first light guide plate; a light source at at least one of one side of the first light guide plate and one side of the second light guide plate; at least one first optical pattern on one of surfaces of the first light guide plate that face each other along the first direction; and at least one second optical pattern on one of surfaces of the second light guide plate that face each other along the first direction, wherein the first optical pattern and the second optical pattern do not overlap each other.

27 Claims, 12 Drawing Sheets

(56) References Cited

U.S. PATENT DOCUMENTS

| | | | |
|---|---|---|---|
| 2012/0224106 A1* | 9/2012 | Kosaka | G02B 6/008 |
| | | | 348/725 |
| 2012/0320310 A1* | 12/2012 | Adachi | G02B 5/045 |
| | | | 349/64 |
| 2013/0033901 A1* | 2/2013 | Nishitani | G02B 6/0036 |
| | | | 362/613 |
| 2013/0240037 A1 | 9/2013 | Yui | |
| 2014/0043846 A1* | 2/2014 | Yang | G02B 6/0035 |
| | | | 362/606 |
| 2015/0109814 A1* | 4/2015 | Chen | G02B 6/0073 |
| | | | 362/606 |
| 2015/0253487 A1* | 9/2015 | Nichol | G02B 6/0036 |
| | | | 362/610 |
| 2019/0079239 A1* | 3/2019 | Vasylyev | G02B 6/0043 |

\* cited by examiner

* 400 : 411a, 411b, 411c
* 500 : 533a, 533b

* 400 : 411a, 411b, 411c
* 500 : 533a, 533b

DISPLAY DEVICE

CROSS-REFERENCE TO RELATED APPLICATION

This application claims priority to and the benefit of Korean Patent Application No. 10-2018-0046604, filed on Apr. 23, 2018, in the Korean Intellectual Property Office (KIPO), the disclosure of which is incorporated by reference herein in its entirety.

1. Field

Aspects of some example embodiments of the present invention relate to a display device.

2. Discussion of Related Art

In general, display devices may include a display panel and a backlight unit for providing light to the display panel.

The backlight unit includes a light source and a light guide plate that totally reflects light from the light source so as to provide the light to the display panel.

In order to provide light to the display panel uniformly, a high total reflection capability and a high light condensing capability of the light guide plate may be achieved.

It is to be understood that this background of the technology portion is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Aspects of some example embodiments of the present invention relate to a display device, and for example, to a display device capable of improving the total reflection capability and the light condensing capability of a light guide plate.

According to an embodiment of the present invention, a display device includes: a first light guide plate and a display panel disposed along a first direction; a second light guide plate between the first light guide plate and the display panel to be spaced apart from the first light guide plate; a light source at at least one of one side of the first light guide plate and one side of the second light guide plate; at least one first optical pattern on one of surfaces of the first light guide plate that face each other along the first direction; and at least one second optical pattern on one of surfaces of the second light guide plate that face each other along the first direction. The first optical pattern and the second optical pattern do not overlap each other.

The first optical pattern may be on one of the surfaces of the first light guide plate that is further away from the second light guide plate.

The second optical pattern may be on one of the surfaces of the second light guide plate that is closer to the first light guide plate.

The display device may further include a sealing portion disposed along an edge of the first light guide plate, between the first light guide plate and the second light guide plate.

An air layer may be positioned in a space surrounded by the first light guide plate, the second light guide plate, and the sealing portion.

The sealing portion may have a closed loop shape or a ring shape.

The display device may further include a support portion between the first light guide plate and the second light guide plate.

The second optical pattern may contact the second light guide plate.

The display device may further include a color conversion layer between the second light guide plate and the display panel.

The second optical pattern may be on one of the surfaces of the second light guide plate that is further away from the first light guide plate.

The display device may further include a color conversion layer between the first light guide plate and the second light guide plate.

The display device may further include a capping layer between the first light guide plate and the color conversion layer.

One surface of the capping layer that faces the first light guide plate jmay have a concave-convex shape.

An air layer may be positioned in a space surrounded by convex portions of the concave-convex shape and the second light guide plate.

The display device may further include a sealing portion disposed along an edge of the first light guide plate, between the first light guide plate and the second light guide plate. An air layer may be positioned in a space surrounded by the color conversion layer, the second light guide plate, and the sealing portion.

The display device may further include a support portion between the second light guide plate and the capping layer.

The sealing portion may include a transparent material.

The support portion may include a transparent material.

The second light guide plate may have a thickness less than a thickness of the first light guide plate.

The light source may face a light incidence surface of the first light guide plate, face a light incidence surface of the second light guide plate, and face between the first light guide plate and the second light guide plate.

The light source may face a light incidence surface of the first light guide plate.

The light source may include: a first light source facing a light incidence surface of the first light guide plate; and a second light source facing a light incidence surface of the second light guide plate.

According to some example embodiments of the present invention, a display device includes: a first light guide plate and a display panel disposed along a first direction; a second light guide plate between the first light guide plate and the display panel; a light source at at least one of one side of the first light guide plate and one side of the second light guide plate; and a color conversion layer between the first light guide plate and the second light guide plate.

The display device may further include at least one first optical pattern on one of surfaces of the first light guide plate that face each other along the first direction; and at least one second optical pattern on one of surfaces of the second light guide plate that face each other along the first direction.

The first optical pattern and the second optical pattern may not overlap each other.

The foregoing is illustrative only and is not intended to be in any way limiting. In addition to the illustrative aspects, exemplary embodiments and features described above, further aspects, exemplary embodiments and features will become apparent by reference to the drawings and the following detailed description.

BRIEF DESCRIPTION OF THE DRAWINGS

A more complete appreciation of the present invention will become more apparent by describing in more detail aspects of some example embodiments thereof with reference to the accompanying drawings, wherein.

DETAILED DESCRIPTION

Figure 1:
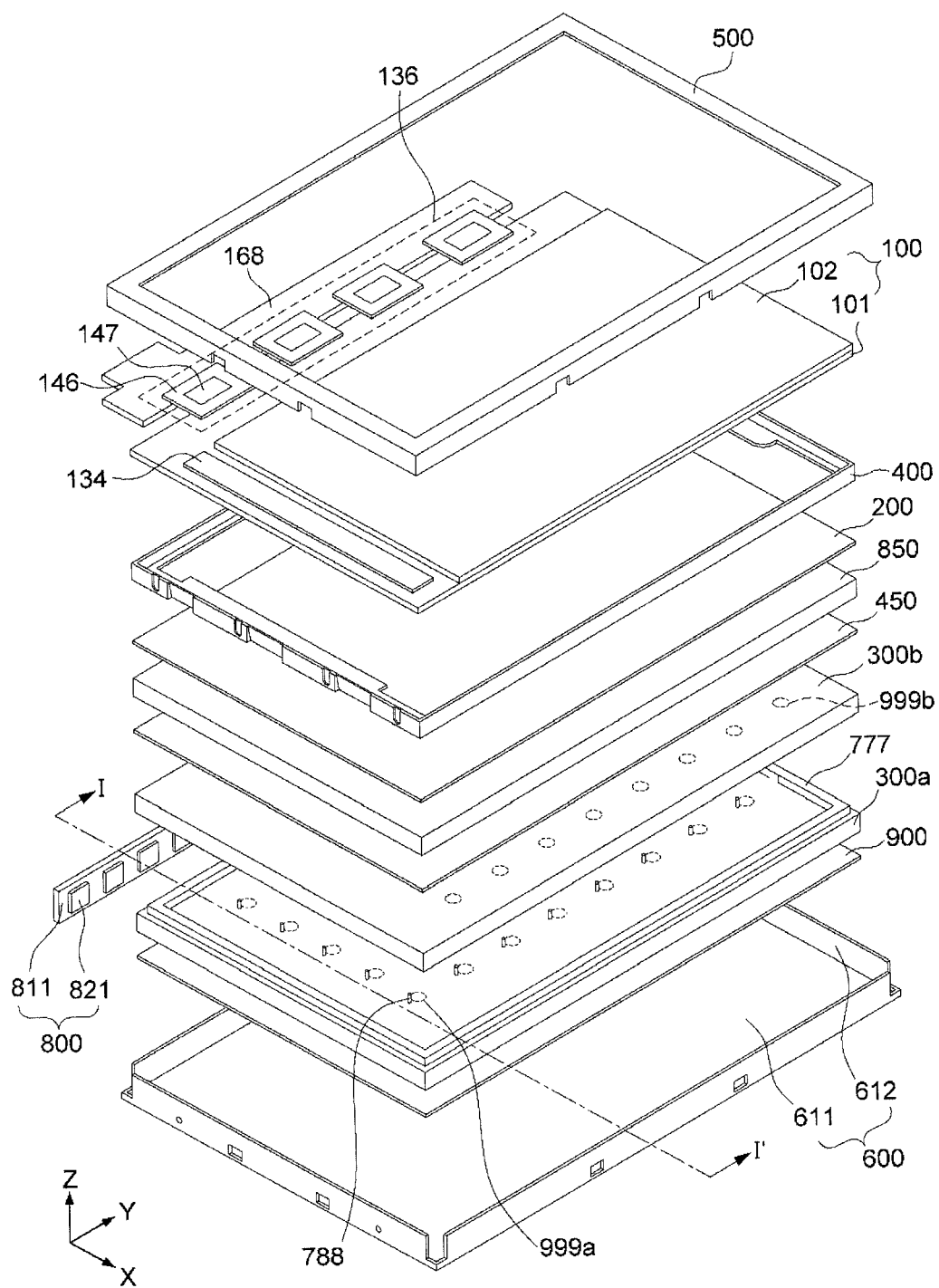
FIG. 1 is an exploded perspective view illustrating a display device according to some example embodiments of the present invention.

Aspects of some example embodiments will now be described more fully hereinafter with reference to the accompanying drawings. Although the invention may be modified in various manners and have several example embodiments, example embodiments are illustrated in the accompanying drawings and will be mainly described in the specification. However, the scope of the invention is not limited to the example embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and refers to an acceptable range of variation for the particular value as determined by one of ordinary skill in the art, considering the measurement in question and the error associated with measurement of the particular quantity (i.e., the limitations of the measurement system). For example, "about" may mean within one or more standard variations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present invention and like reference numerals refer to like elements throughout the specification.

Hereinafter, a display device according to some example embodiments of the present invention will be described in more detail with reference to FIGS. 1 to 10.

Figure 2:
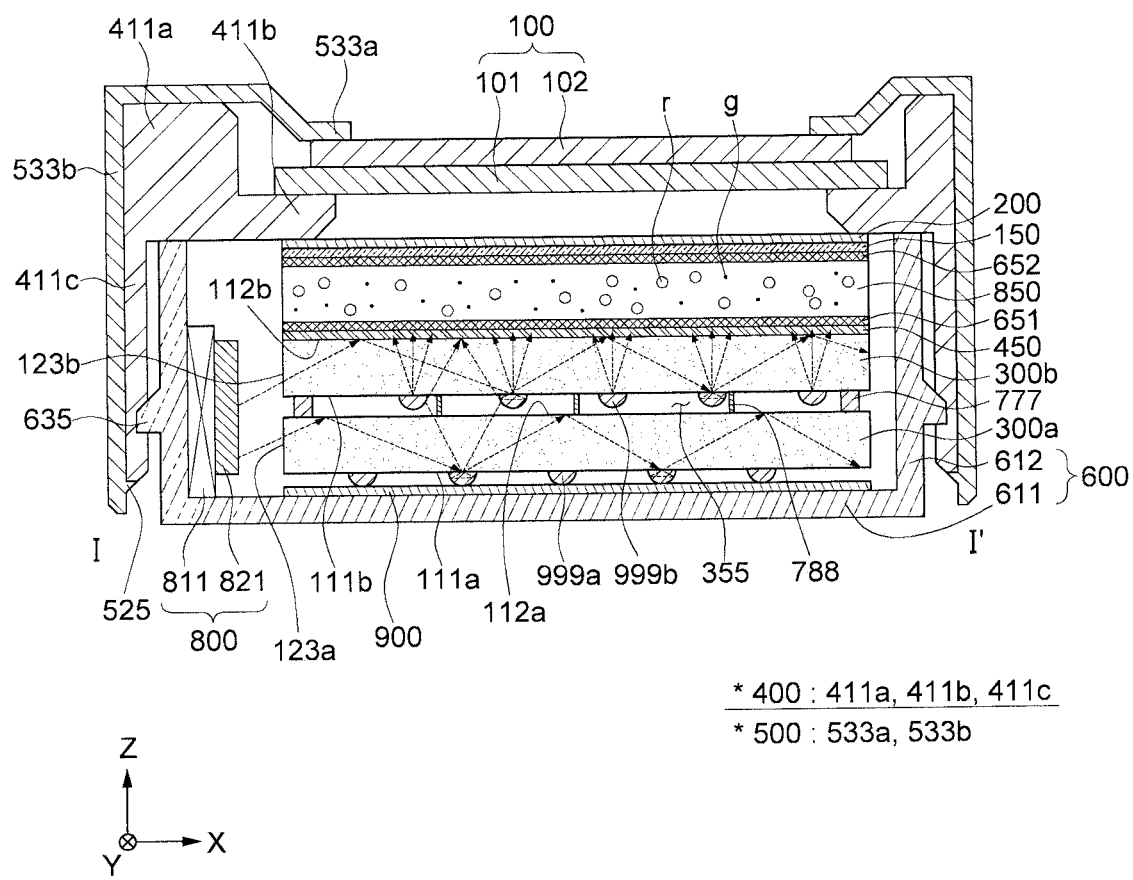
FIG. 2 is a cross-sectional view taken along the line I-I' of FIG. 1.

FIG. 1 is an exploded perspective view illustrating a display device according to some example embodiments of the present invention, and FIG. 2 is a cross-sectional view taken along the line I-I' of FIG. 1. The dotted arrows in FIG. 2 represent the path of light.

As illustrated in FIGS. 1 and 2, a display device according to some example embodiments of the present invention includes a light source module 800, a bottom case 600, a reflection plate 900, a first light guide plate 300*a*, a sealing portion 777, a support portion 788, a second light guide plate 300*b*, a low refractive index layer 450, a color conversion layer 850, an optical sheet 200, a support frame 400, a display panel 100, and a top case 500.

The display device according to some example embodiments of the present invention may further include a first capping layer 651, a second capping layer 652 and an overcoat layer 150, as illustrated in FIG. 2.

In such an embodiment, the light source module 800, the bottom case 600, the reflection plate 900, the first light guide plate 300*a*, the sealing portion 777, the support portion 788, the second light guide plate 300*b*, the low refractive index layer 450, the color conversion layer 850, the optical sheet 200, and the support frame 400 are included in a backlight unit. In an embodiment, the display panel 100 and the backlight unit are assembled in a laminated state to constitute a display module. The display module includes the top case 500 for protecting and securing the display panel 100 and the backlight unit, and a driving circuit board for driving the display panel 100.

The bottom case 600, the reflection plate 900, the first light guide plate 300*a*, the second light guide plate 300*b*, the low refractive index layer 450, the first capping layer 651, the color conversion layer 850, the second capping layer 652, the overcoat layer 150, the optical sheet 200, the support frame 400, the display panel 100, and the top case 500 are sequentially arranged along the Z axis.

The bottom case 600 has an accommodation space therein. The light source module 800, the reflection plate 900, the first light guide plate 300*a*, the sealing portion 777, the support portion 788, the second light guide plate 300*b*, the low refractive index layer 450, the first capping layer 651, the color conversion layer 850, the second capping layer 652, the optical sheet 200, and the overcoat layer 150 are located in the accommodation space.

In order to secure the accommodation space, the bottom case 600 may include a base portion 611 and a plurality of side portions 612. For example, the base portion 611 may have a quadrangular shape, and the side portions 612 protrude from respective edge portions of the base portion 611 to have a predetermined height. For example, the side portions 612 may protrude along the Z-axis direction from respective edges of the base portion 611. Alternatively, the side portions 612 may protrude toward the top case 500 from respective edges of the base portion 611.

Edges of the side portions 612 that are adjacently arranged may be connected to each other. A space defined by the side portions 612 and the base portion 611 may correspond to the aforementioned accommodation space. In an exemplary embodiment, a locking projection 635 may be located on the outer side of the side portions 612 that face each other, and the support frame 400 may be fastened to the bottom case 600 by the locking projection 635. A portion of the corresponding side portion 612 may protrude toward the support frame 400, thereby forming the locking projection 635.

The light source module 800 generates light. The light generated in the light source module 800 may be provided to the display panel 100 through the first light guide plate 300*a*, the second light guide plate 300*b*, the low refractive index layer 450, the first capping layer 651, the color conversion layer 850, the second capping layer 652, the overcoat layer 150, and the optical sheet 200.

The light source module 800 may include at least one light source 821 and a light source circuit board 811.

The light source 821 emits light. For example, the light source 821 may emit blue light.

The light source 821 faces the first light guide plate 300*a* and the second light guide plate 300*b*. For example, a light emission surface of the light source 821 may face a light incidence surface 123*a* of the first light guide plate 300*a* (hereinafter, "a first light incidence surface 123*a*") and a light incidence surface 123*b* of the second light guide plate 300*b* (hereinafter, "a second light incidence surface 123*b*").

In addition, the light source 821 faces between the first light guide plate 300*a* and the second light guide plate 300*b*. For example, the light source 821 may face the sealing portion 777 between the first light guide plate 300*a* and the second light guide plate 300*b*.

The light source 821 may include a light emitting diode ("LED"). For example, the light source 821 may include a blue LED that emits blue light.

When the light source module 800 includes the plurality of light sources 821, the plurality of light sources 821 are located along the first and second light incidence surfaces 123*b* and 123*b*. In other words, the plurality of light sources 821 are located along the Y-axis direction.

One surface of the light source circuit board 811 may be divided into at least one mounting area and a wiring area. When the light source module 800 includes the plurality of light sources 821, the light sources 821 are located in the respective mounting areas, and a plurality of signal lines for transmitting driving power to the light sources 821 are located in the wiring area. The aforementioned driving power is generated in an external power supplier, and then applied to the plurality of signal lines via a separate connector.

The light source module 800 may be located on one side surface, opposite side surfaces, or all four side surfaces of the first and second light guide plates 300*a* and 300*b* in accordance with the size and luminous uniformity of the display panel.

The reflection plate 900 is positioned on the base portion 611 of the bottom case 600. For example, the reflection plate 900 is positioned between the base portion 611 and the first light guide plate 300*a*. The reflection plate 900 reflects the light that has passed through lower outer surfaces of the first light guide plate 300*a* and the second light guide plate 300*b* and emitted outwards to proceed back toward the first light guide plate 300*a*. Accordingly, the light loss rate may be minimized (or substantially minimized) or reduced.

The first light guide plate 300*a* is positioned on the reflection plate 900. For example, the first light guide plate 300*a* is positioned between the reflection plate 900 and the second light guide plate 300*b*. The first light incidence surface 123*a* of the first light guide plate 300 faces the light source. The light emitted from the light source 821 is incident to the first light incidence surface 123*a* and then proceeds to the inside of the first light guide plate 300*a*. The light in the first light guide plate 300*a* may be transmitted to the second light guide plate 300*b* by total reflection. In addition, the light in the first light guide plate 300*a* may be transmitted to an end portion of the first light guide plate 300*a* by the total reflection. In such a case, the end portion of the first light guide plate 300*a* refers to a surface of the first light guide plate 300*a* that opposes the first light incidence surface 123*a*.

The light guide plate 300 may include or be formed of acrylic resins, such as polymethyl methacrylate (PMMA), polycarbonate (PC), reinforced glass, or the like. For example, the first light guide plate 300a may include or be formed of glass.

The second light guide plate 300b is positioned on the first light guide plate 300a. For example, the second light guide plate 300b is positioned between the first light guide plate 300a and the low refractive index layer 450. The second light incidence surface 123b of the second light guide plate 300b faces the light source 821. The light emitted from the light source 821 is incident to the second light incidence surface 123b and then proceeds to the inside of the second light incidence plate 300b. The light in the second light guide plate 300b may be transmitted to the color conversion layer 850 by total reflection. In addition, the light in the second light guide plate 300b may be transmitted to an end portion of the second light guide plate 300b by the total reflection. In such a case, the end portion of the second light guide plate 300b refers to a surface of the second light guide plate 300b that opposes the second light incidence surface 123b.

The second light guide plate 300b may include a material the same as (or substantially the same as) a material included in the first light guide plate 300a. For example, the second light guide plate 300b may include glass.

The second light guide plate 300b faces the first light guide plate 300a. The second light guide plate 300b is spaced apart from the first light guide plate 300a by a predetermined distance. The first light guide plate 300a and the second light guide plate 300b are not in contact with each other. An air layer 355 is positioned between the first light guide plate 300a and the second light guide plate 300b.

The sealing portion 777 is positioned between the first light guide plate 300a and the second light guide plate 300b. For example, the sealing portion 777 is positioned along an edge of the first light guide plate 300a (or an edge of the second light guide plate 300b) between the first light guide plate 300a and the second light guide plate 300b. In other words, the sealing portion 777 is positioned between the edge of the first light guide plate 300a and the edge of the second light guide plate 300b. For example, as illustrated in FIG. 1, the sealing portion 777 may have a closed loop shape or a ring shape enclosing a center portion of the first light guide plate 300a (or a center portion of the second light guide plate 300b).

The sealing portion 777 may directly contact the first light guide plate 300a and the second light guide plate 300b. For example, one surface of the sealing portion 777 contacts one of surfaces of the first light guide plate 300a and the second light guide plate 300b that face each other, and another surface of the sealing portion 777 contacts the other of the surfaces of the first light guide plate 300a and the second light guide plate 300b that face each other. For example, the one surface of the sealing portion 777 contacts an upper surface 112a of the first light guide plate 300a to be described below, and the other surface of the sealing portion 777 contacts a lower surface 111b of the second light guide plate 300b to be described below.

The sealing portion 777 may include or be formed of a transparent material. For example, the sealing portion 777 may include or be formed of a transparent resin or a transparent organic material.

The aforementioned air layer 355 is positioned in the space surrounded by the first light guide plate 300a, the second light guide plate 300b, and the sealing portion 777. The air layer 355 may improve the total reflectance of the first light guide plate 300a. For example, the refractive index of the air layer 355 is about 1 and the refractive index of the first light guide plate 300a including glass is about 1.5. Accordingly, a ratio (e.g., a refractive index ratio) between the refractive index of the first light guide plate 300a and the refractive index of the air layer 355 may be increased, so that the reflectance of the first light guide plate 300a, that is, the total reflectance described above, may be increased.

The support portion 788 is positioned between the first light guide plate 300a and the second light guide plate 300b. For example, the support portion 788 is positioned in the space defined by the first light guide plate 300a, the second light guide plate 300b, and the sealing portion 777 described above. The support portion 788 is enclosed by the sealing portion 777. The support portion 788 may prevent (or substantially prevent) sagging of the second light guide plate 300b. That is, when the size of the second light guide plate 300b is large, the central portion of the second light guide plate 300b may sag in the direction toward the first light guide plate 300a due to the weight of the second light guide plate 300b itself. The aforementioned support portion 788 may prevent (or substantially prevent) sagging of the second light guide plate 300b.

The support portion 788 may directly contact the first light guide plate 300a and the second light guide plate 300b. For example, one surface of the support portion 788 contacts one of the surfaces of the first light guide plate 300a and the second light guide plate 300b that face each other, and another surface of the support portion 788 contacts the other of the surfaces of the first light guide plate 300a and the second light guide plate 300b that face each other. For example, the one surface of the support portion 788 contacts the upper surface 112a of the first light guide plate 300a to be described below, and the other surface of the support portion 788 contacts the lower surface 111b of the second light guide plate 300b to be described below.

The support portion 788 may include or be formed of a transparent material. For example, the support portion 788 may include or be formed of a transparent resin or a transparent organic material.

The display device according to some example embodiments of the present invention may include a plurality of support portions 788, in which case the plurality of support portions 788 may be unconstrainedly located within the space described above. However, the plurality of support portions 788 do not contact a second optical pattern 999b.

The low refractive index layer 450 is positioned on the second light guide plate 300b. For example, the low refractive index layer 450 is positioned between the second light guide plate 300b and the first capping layer 651. The low refractive index layer 450 may have a plurality of holes. The plurality of holes may be positioned outside and inside the low refractive index layer 450. These holes may be defined through the low refractive index layer 450 in the Z-axis direction.

The low refractive index layer 450 may have a refractive index of about 1.2. When the second light guide plate 300b includes glass, a ratio (e.g., a refractive index ratio) between the refractive index of the second light guide plate 300b and the refractive index of the color conversion layer 850 is relatively small, while a ratio between the refractive index of the second light guide plate 300b and the refractive index of the low refractive index layer 450 is relatively large. Because the ratio between the refractive index of the second light guide plate 300b and the refractive index of the low refractive index layer 450 is relatively large, the reflectance of the second light guide plate 300b, that is, the total reflectance described above, may be increased. In other words, the reflectance of the second light guide plate 300b may be increased by increasing the refractive index ratio between the second light guide plate 300b and the color conversion layer 850. In some example embodiments, the low refractive index layer 450 may be omitted.

The first capping layer 651 is positioned on the low refractive index layer 450. For example, the first capping layer 651 is positioned between the low refractive index layer 450 and the color conversion layer 850. The first capping layer 651 may prevent (or substantially prevent) the color conversion layer 850 from penetrating into the hole of the low refractive index layer 450.

The color conversion layer 850 is positioned on the first capping layer 651. For example, the color conversion layer 850 is positioned between the first capping layer 651 and the second capping layer 652.

The color conversion layer 850 changes the color of the light provided from the first and second light guide plates 300a and 300b. For example, the color conversion layer 850 converts blue light provided from the light source 821 through the first and second light guide plates 300a and 300b into white light.

The color conversion layer 850 may include, for example, quantum dot particles. In addition, the color conversion layer 850 may further include at least one metal based on sulfide, silicon (Si), and nitride.

The quantum dot particle converts the wavelength of light to emit a desired light. Based on the size of the quantum dot particle, the wavelength of light emitted from the color conversion layer 850 may vary. In other words, the color of light emitted from the color conversion layer 850 may vary depending on the diameter of the quantum dot.

The quantum dot particle may have a diameter in the range from about 2 nm to about 10 nm. For example, when the quantum dot particle has a relatively small diameter, the wavelength of the emitted light may be shortened, and blue-based light is emitted. In addition, as the size of the quantum dot increases, the wavelength of the emitted light is lengthened, and red-based light is emitted. For example, a quantum dot particle having a diameter of about 10 nm may emit red light, a quantum dot particle having a diameter of about 7 nm may emit green light, and a quantum dot particle having a diameter of about 5 nm may emit blue light.

When the light source 821 emits blue light as described above, the color conversion layer 850 may include two kinds of quantum dot particles r and g. These two kinds of quantum dot particles may include, for example, quantum dot particles r that emit red light (hereinafter, "red quantum dot particles") and quantum dot particles g that emit green light (hereinafter, "green quantum dot particles"). White light, which is a mixture of blue light, red light and green light, is generated from the color conversion layer 850 including the red quantum dot particles r and the green quantum dot particles g.

The quantum dot particle may have a double-structure including an inner core and an outer shell surrounding the inner core. For example, a quantum dot particle including CdSe/ZnS includes an inner core including CdSe and an outer shell including ZnS.

Dissimilar to the above, the color conversion layer 850 may include quantum rod particles, instead of the quantum dot particles.

The second capping layer 652 is positioned on the color conversion layer 850. For example, the second capping layer 652 may be positioned between the color conversion layer 850 and the overcoat layer 150.

The overcoat layer 150 is positioned on the second capping layer 652. For example, the overcoat layer 150 is positioned between the second capping layer 652 and the optical sheet 200.

The optical sheet 200 is positioned on the overcoat layer 150. For example, the optical sheet 200 is positioned between the overcoat layer 150 and the display panel 100. The optical sheet 200 may include a double bright enhancement film ("DBEF").

The support frame 400 is fastened to the bottom case 600 and supports the display panel 100 and the top case 500. In addition, the support frame 400 maintains a uniform gap between the display panel 100 and the optical sheet 200. To this end, the support frame 400 may have a quadrangular frame shape including a first support portion 411a, a second support portion 411b, and a fastening portion 411c.

The first support portion 411a is located on the plurality of side portions 612 and supports the top case 500 located on the first support portion 411a.

The second support portion 411b extends from an inner edge of the first support portion 411a toward the space between the optical sheet 200 and the display panel 100. The second support portion 411b has a height less than a height of the first support portion 411a. A space is defined between the top case 500 and the second support portion 411b due to the height difference between the second support portion 411b and the first support portion 411a, and an edge portion of the display panel 100 is located in the space.

The fastening portion 411c extends from a lower surface of the first support portion 411a toward the side portion 612. A coupling groove is defined on an inner side surface of the fastening portion 411c, i.e., one of surfaces of the fastening portion 411c that faces the locking projection 635. As the locking projection 635 is inserted into the coupling groove, the support frame 400 may be fastened to the bottom case 600.

The top case 500 has a quadrangular frame shape having an opening at the center portion thereof. The top case 500 is positioned on the display panel 100. A display area of the display panel 100 is exposed through the opening of the top case 500. The top case 500 covers an edge portion of the display panel 100, an upper surface and a side surface of the first support portion 411a of the support frame 400, and a side surface of the fastening portion 411c of the support frame 400. To this end, the top case 500 includes a front cover 533a that covers the edge portion of the display panel 100 and the upper surface of the first support portion 411a, and a side cover 533b that covers the side surface of the first support portion 411a and the side surface of the fastening portion 411c.

In an embodiment, a hook 525 may be located on an inner side surface of the side cover 533b, and the hook 525 contacts a lower surface of the fastening portion 411c of the support frame 400. The top case 500 may be fastened to the support frame 400 by the hook 525. In addition, one of the side covers 533b has an opening. A printed circuit board ("PCB") 168 to be described below is exposed outside the top case 500 through the opening of the side cover 533b.

The display panel 100 is positioned on the optical sheet 200. The display panel 100 displays images. The display panel 100 includes a lower panel 101 and an upper panel 102 located to face the lower panel 101.

A light control layer is positioned between a display area of the lower panel 101 and the upper panel 102, and the light control layer controls the transmittance of light provided from the color conversion layer 850. Any element that may control the transmittance of light may be used as the light control layer. For example, the light control layer may be one of a liquid crystal layer, an electro-wetting layer, and an electrophoretic layer. Hereinafter, the light control layer is to be described as a liquid crystal layer by way of example.

The lower panel 101 includes a plurality of gate lines, a plurality of data lines, and a plurality of pixel electrodes. The data lines intersect the gate lines. The gate lines are connected to a gate driver 134, and the data lines are connected to a data driver 136.

The gate driver 134 is located in a non-display area of the lower panel 101. The gate driver 134 generates gate signals according to a gate control signal applied from a timing controller, and sequentially applies the gate signals to the plurality of gate lines. The gate driver 134 may include, for example, a shift register that shifts a gate start pulse based on a gate shift clock to produce the gate signals. The shift register may include a plurality of driving transistors.

The data driver 136 includes a plurality of data driving integrated circuits ("ICs") 147. The data driving ICs 147 receive digital image data signals and a data control signal applied thereto from the timing controller. The data driving ICs 147 sample the digital image data signals according to the data control signal, latch the sampled image data signals corresponding to one horizontal line every horizontal period, and apply the latched image data signal to the data lines. That is, the data driving ICs 147 convert the digital image data signals applied from the timing controller into analog image signals using a gamma voltage applied from a power supplier, and apply the analog image signals to the data lines.

Respective data driving ICs 147 are mounted on carriers 146. The carriers 146 are connected between the PCB 168 and the display panel 100. The timing controller and the power supplier described above may be located on the PCB 168, and the carrier 146 includes input wirings configured to transmit various signals applied thereto from the timing controller and the power supplier to the data driving IC 147 and output wirings configured to transmit the image data signals output from the data driving IC 147 to the corresponding one of the data lines. In an exemplary embodiment, at least one carrier 146 may further include auxiliary lines to transmit various signals applied from the timing controller and the power supplier to the gate driver 134, and the auxiliary lines are connected to connection lines located at the lower panel 101. The connection lines connect the auxiliary wirings to the gate driver 134. The connection lines may be formed on the lower panel 101 in a line-on-glass manner.

Figure 3:
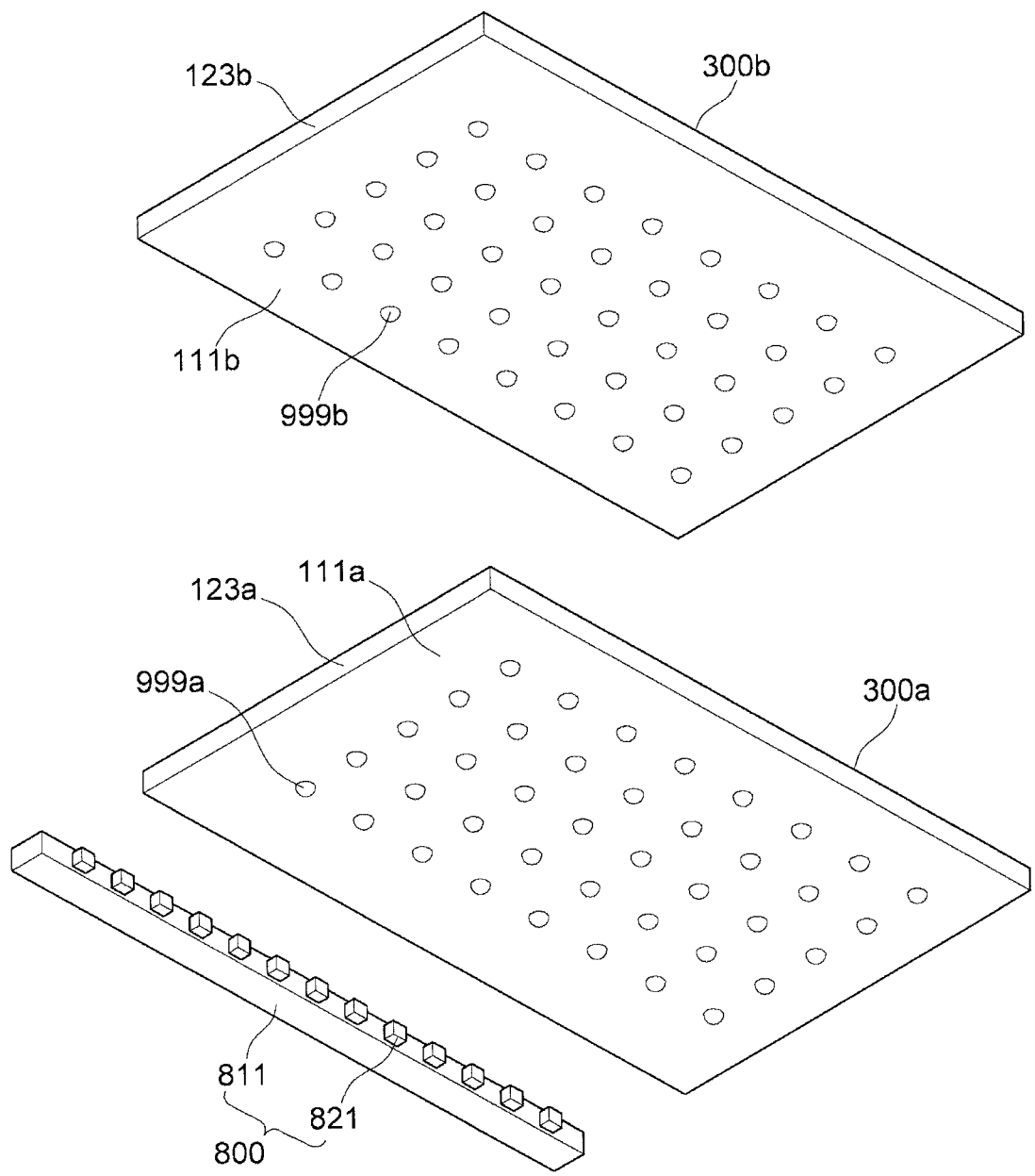
FIG. 3 is a view illustrating a first light guide plate and a second light guide plate of FIG. 1.
Figure 4:
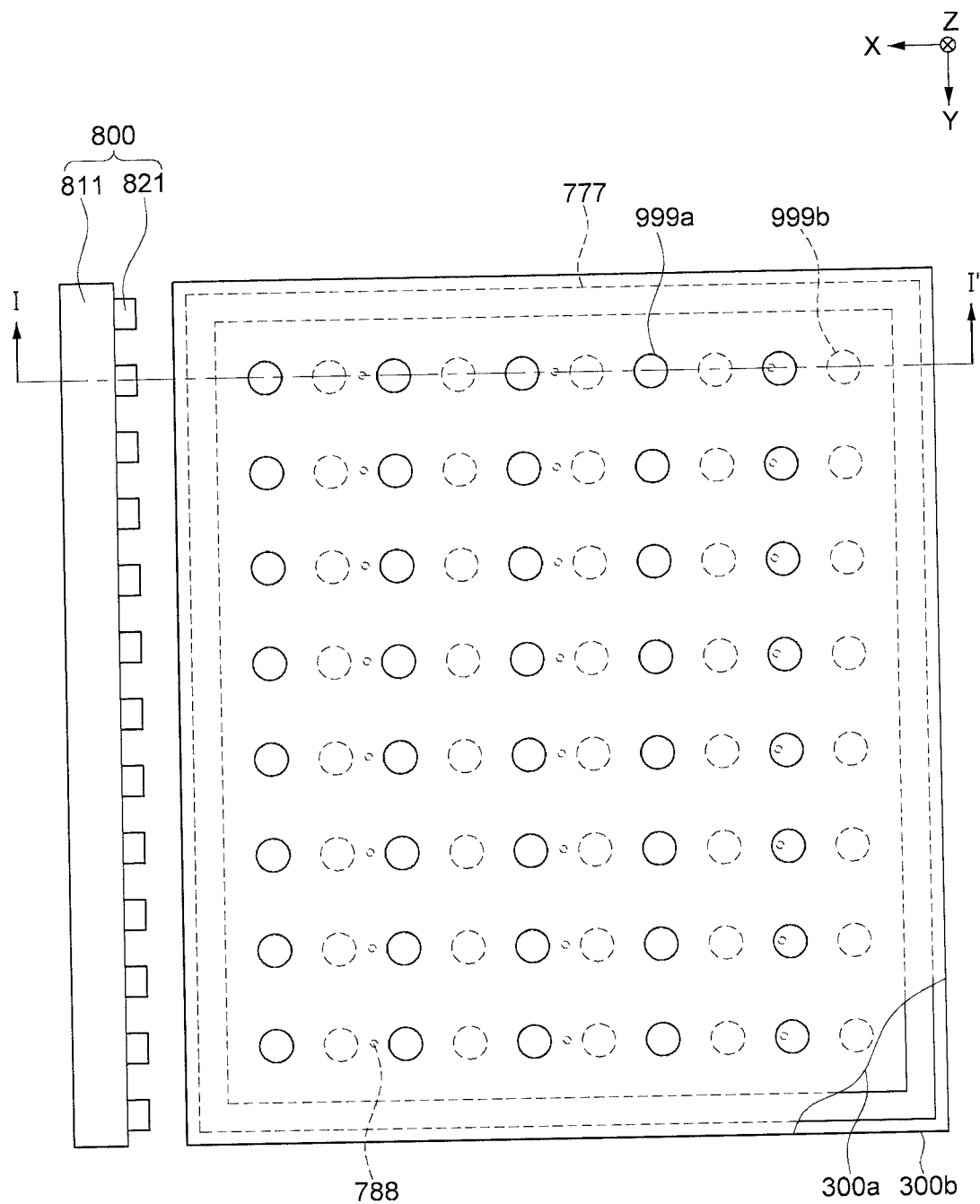
FIG. 4 is a view illustrating the second light guide plate viewed from the first light guide plate of FIG. 2.

FIG. 3 is a view illustrating the first light guide plate 300a and the second light guide plate 300b of FIG. 1, and FIG. 4 is a view illustrating the second light guide plate 300b from the view of the first light guide plate 300a of FIG. 2. The line I-I' in FIG. 4 corresponds to the line I-I' in FIG. 1.

At least one first optical pattern 999a is positioned on one surface of the first light guide plate 300a. For example, when surfaces of the first light guide plate 300a that face each other in the Z-axis direction are defined as a first lower surface 111a and a first upper surface 112a, respectively, the first optical pattern 999a is located on the first lower surface 111a.

Of the first lower surface 111a and the first upper surface 112a of the first light guide plate 300a, the first upper surface 112a is located closer to the second light guide plate 300b than the first lower surface 111a is thereto. In other words, of the first lower surface 111a and the first upper surface 112a of the first light guide plate 300a, the first lower surface 111a is located further away from the second light guide plate 300b than the first upper surface 112a is therefrom.

The first optical pattern 999a may have a hemispherical shape, as illustrated in FIG. 3.

The first optical pattern 999a diffuses or condenses light. For example, the first optical pattern 999a diffuses the light incident to the first light guide plate 300a, and condenses the light reflected from the reflection plate 900.

When the display device according to an embodiment of the present invention includes the plurality of first optical patterns 999a, the plurality of first optical patterns 999a may be arranged in a matrix form on the first lower surface 111a, as illustrated in FIGS. 3 and 4. For example, the first optical patterns 999a may be located along the X-axis direction and the Y-axis direction.

At least one second optical pattern 999b is positioned on one surface of the second light guide plate 300b. For example, when surfaces of the second light guide plate 300b that face each other in the Z-axis direction are defined as a second lower surface 111b and a second upper surface 112b, respectively, the second optical pattern 999b is located on the second lower surface 111b.

Of the second lower surface 111b and the second upper surface 112b of the second light guide plate 300b, the second lower surface 111b is located closer to the first light guide plate 300a than the second upper surface 111a is thereto. In other words, of the second lower surface 111b and the second upper surface 112b of the second light guide plate 300b, the second upper surface 112b is located further away from the first light guide plate 300a than the second lower surface 111b is therefrom.

The second optical pattern 999b may have a shape substantially the same as that of the first optical pattern 999a. For example, the second optical pattern 999b may have a hemispherical shape, as illustrated in FIG. 3.

The second optical pattern 999b diffuses or condenses light. For example, the second optical pattern 999b diffuses the light incident to the second light guide plate 300b, and condenses the light incident from the first light guide plate 300a.

When the display device according to some example embodiments of the present invention includes the plurality of second optical patterns 999b, the plurality of second optical patterns 999b may be arranged in a matrix form on the second lower surface 111b, as illustrated in FIGS. 3 and 4. For example, the second optical patterns 999b may be located along the X-axis direction and the Y-axis direction.

The second optical pattern 999b does not overlap the first optical pattern 999a. For example, as illustrated in FIGS. 2 and 4, the second optical pattern 999b does not overlap the first optical pattern 999a with respect to the Z-axis direction.

When the display device according to an embodiment of the present invention includes the plurality of first optical patterns 999a and the plurality of second optical patterns 999b, none of the plurality of second optical patterns 999b overlaps the first optical patterns 999a.

Because the first optical pattern 999a and the second optical pattern 999b do not overlap each other, the light diffused by the first optical pattern 999a may be incident to a side surface of the second optical pattern 999b. The light incident to the side surface of the second optical pattern 999b is reflected from the side surface of the second optical pattern 999b and is condensed. For example, as illustrated in FIG. 2, lights incident to side surfaces of two adjacent second optical patterns 999b that face each other, respectively, are changed in terms of their path so that they may proceed toward one point. Accordingly, the light condensing capability of the first light guide plate 300a and the second light guide plate 300b may be improved.

Figure 5:
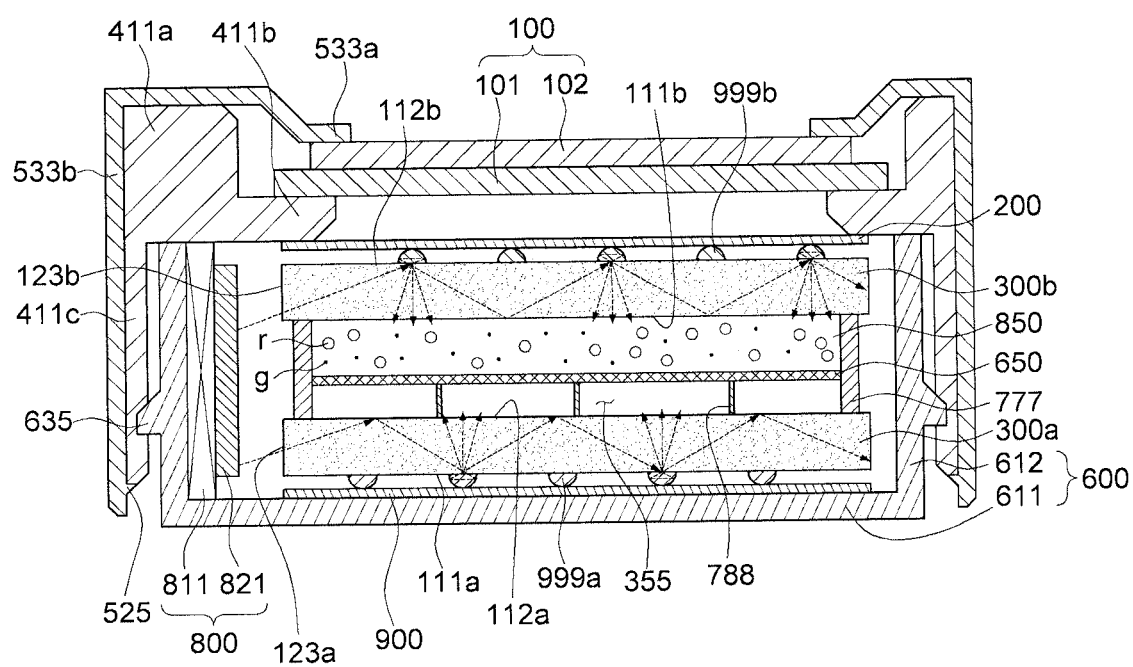
FIG. 5 is a cross-sectional view illustrating a display device according to some example embodiments of the present invention.
Figure 5:
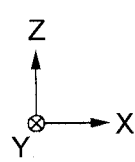

FIG. 5 is a cross-sectional view illustrating a display device according to another embodiment of the present invention. The dotted arrows in FIG. 5 represent the path of light.

As illustrated in FIG. 5, a display device according to another embodiment of the present invention includes a light source module 800, a bottom case 600, a reflection plate 900, a first light guide plate 300a, a sealing portion 777, a support portion 788, a capping layer 650, a color conversion layer 850, a second light guide plate 300b, an optical sheet 200, a support frame 400, a display panel 100, and a top case 500.

The light source module 800, the bottom case 600, the reflection plate 900, the first light guide plate 300a, the color conversion layer 850, the second light guide plate 300b, the optical sheet 200, the support frame 400, the display panel 100, and the top case 500 are sequentially arranged along the Z axis.

The color conversion layer 850 is positioned between the first light guide plate 300a and the second light guide plate 300b. For example, the color conversion layer 850 is positioned between the capping layer 650 and the second light guide plate 300b.

A capping layer 650 is positioned between the first light guide plate 300a and the color conversion layer 850.

The support portion 788 is positioned between the first light guide plate 300a and the capping layer 650. For example, the support portion 788 is positioned in the space surrounded by the first light guide plate 300a, the capping layer 650, and the sealing portion 777. The support portion 788 is enclosed by the sealing portion 777. The support portion 788 supports the capping layer 650, the color conversion layer 850, and the second light guide plate 300b.

The support portion 788 may directly contact the first light guide plate 300a and the capping layer 650. For example, one surface of the support portion 788 contacts one of surfaces of the first light guide plate 300a and the capping layer 650 that face each other, and another surface of the support portion 788 contacts the other of the surfaces, of the first light guide plate 300a and the capping layer 650 that face each other.

An air layer 355 is positioned in the space surrounded by the first light guide plate 300a, the capping layer 650 and the sealing portion 777.

At least one first optical pattern 999a is positioned on one surface of the first light guide plate 300a. For example, when surfaces of the first light guide plate 300a that face each other in the Z-axis direction are defined as a first lower surface 111a and a first upper surface 112a, respectively, the first optical pattern 999a is located on the first lower surface 111a. The first optical pattern 999a of FIG. 5 is substantially the same as the first optical pattern 999a of FIG. 2 described above.

At least one second optical pattern 999b is positioned on one surface of the second light guide plate 300b. For example, when surfaces of the second light guide plate 300b that face each other in the Z-axis direction are defined as a second lower surface 111b and a second upper surface 112b, respectively, the second optical pattern 999b is located on the second upper surface 112b. The second optical pattern 999b of FIG. 5 is substantially the same as the second optical pattern 999b of FIG. 2 described above.

As illustrated in FIG. 5, the second optical pattern 999b does not overlap the first optical pattern 999a. For example, the second optical pattern 999b does not overlap the first optical pattern 999a with respect to the Z-axis direction.

When the display device according to the present embodiment of the present invention includes the plurality of first optical patterns 999a and the plurality of second optical patterns 999b, none of the plurality of second optical patterns 999b overlaps the first optical patterns 999a.

The light source module 800, the bottom case 600, the reflection plate 900, the first light guide plate 300a, the first optical pattern 999a, the sealing portion 777, the second light guide plate 300b, the color conversion layer 850, the optical sheet 200, the support frame 400, the display panel 100, and the top case 500 of FIG. 5 are substantially the same as those of FIGS. 1 to 4 described above, respectively.

According to the display device of FIG. 5, the color conversion layer is surrounded by the first light guide plate, the second light guide plate, and the sealing portion. Accordingly, the color conversion layer is not exposed to the outside. Accordingly, foreign matter such as moisture may not penetrate into the color conversion layer. In addition, the low refractive index layer may be omitted, and the manufacturing process of the display device may be simplified.

Figure 6:
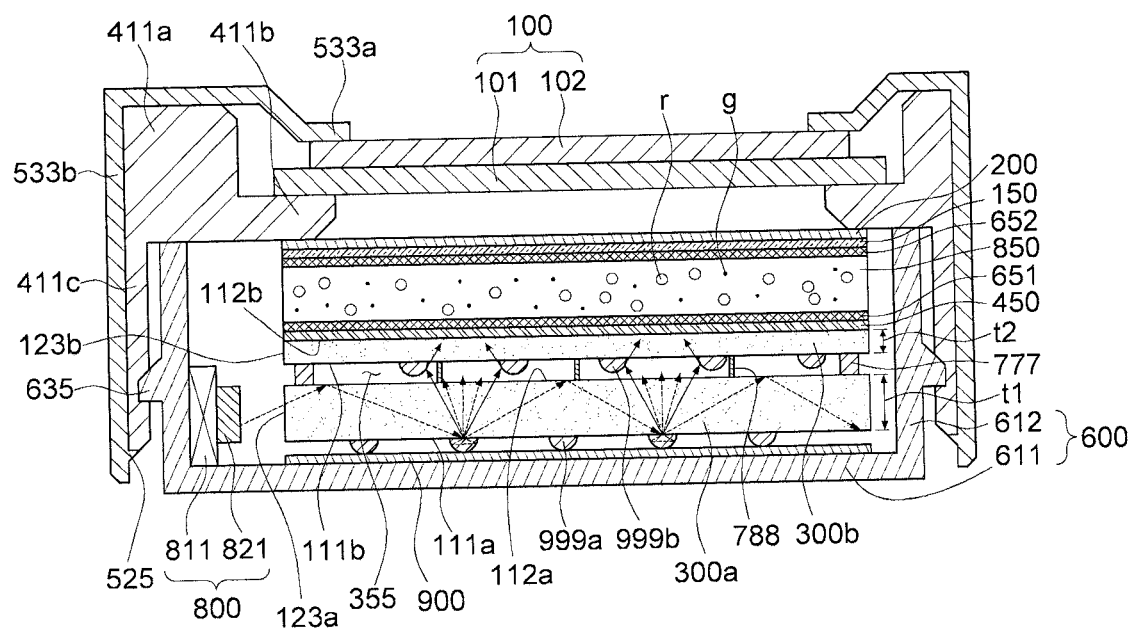
FIG. 6 is a cross-sectional view illustrating a display device according to some example embodiments of the present invention.

FIG. 6 is a cross-sectional view illustrating a display device according to another embodiment of the present invention. The dotted arrows in FIG. 6 represent the path of light.

As illustrated in FIG. 6, a display device according to another embodiment of the present invention includes a light source module 800, a bottom case 600, a reflection plate 900, a first light guide plate 300a, a sealing portion 777, a support portion 788, a second light guide plate 300b, a low refractive index layer 450, a first capping layer 651, a color conversion layer 850, a second capping layer 652, an overcoat layer 150, an optical sheet 200, a support frame 400, a display panel 100, and a top case 500.

The second light guide plate 300b of FIG. 6 has a thickness less than a thickness of the first light guide plate 300a. In other words, the thickness t2 of the second light guide plate 300b is less than the thickness t1 of the first light guide plate 300a. As used herein, the thickness t1 of the first light guide plate 300a indicates the size of the first light guide plate 300a measured in the Z-axis direction, and the thickness t2 of the second light guide plate 300b indicates the size of the second light guide plate 300b measured in the Z-axis direction.

A light source 821 of FIG. 6 faces the first light guide plate 300a. For example, a light emission surface of the light source 821 faces a first light incidence surface 123a of the first light guide plate 300a.

The light source module 800, the bottom case 600, the reflection plate 900, the first light guide plate 300a, the first optical pattern 999a, the sealing portion 777, the support portion 788, the second light guide plate 300b, the second optical pattern 999b, the low refractive index layer 450, the first capping layer 651, the color conversion layer 850, the second capping layer 652, the overcoat layer 150, the optical sheet 200, the support frame 400, the display panel 100, and the top case 500 of FIG. 6 are the same as (or substantially the same as) those of FIGS. 1 to 4 described above, respectively.

Figure 7:
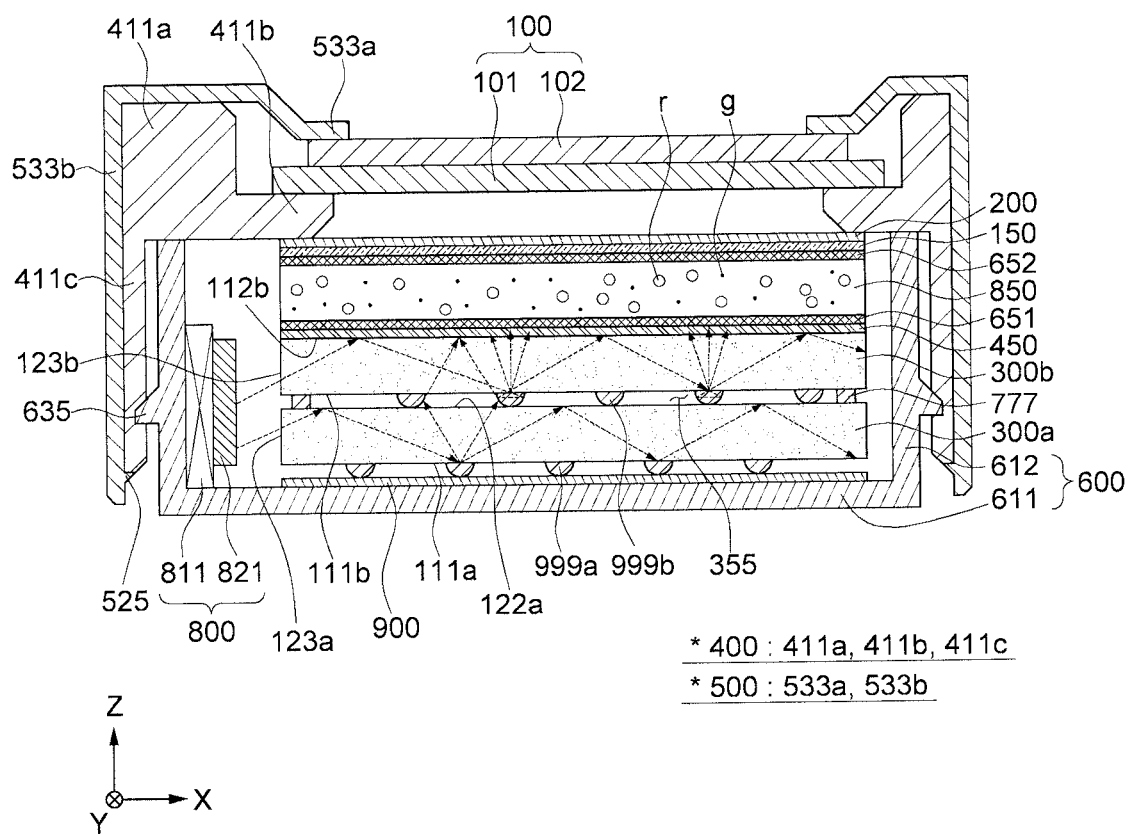
FIG. 7 is a cross-sectional view illustrating a display device according to some example embodiments of the present invention.

FIG. 7 is a cross-sectional view illustrating a display device according to another embodiment of the present invention. The dotted arrows in FIG. 7 represent the path of light.

As illustrated in FIG. 7, a display device according to some example embodiments of the present invention includes a light source module 800, a bottom case 600, a reflection plate 900, a first light guide plate 300a, a sealing portion 777, a second light guide plate 300b, a low refractive index layer 450, a first capping layer 651, a color conversion layer 850, a second capping layer 652, an overcoat layer 150, an optical sheet 200, a support frame 400, a display panel 100, and a top case 500.

The display device of FIG. 7 does not include the support portion 788 described above.

At least one second optical pattern 999b of FIG. 7 contacts the first light guide plate 300a. For example, all the second optical patterns 999b may contact an upper surface 112a of the first light guide plate 300a. The second optical pattern 999b may prevent (or substantially prevent) sagging of the second light guide plate 300b.

The light source module 800, the bottom case 600, the reflection plate 900, the first light guide plate 300a, the first optical pattern 999a, the sealing portion 777, the second light guide plate 300b, the second optical pattern 999b, the low refractive index layer 450, the first capping layer 651, the color conversion layer 850, the second capping layer 652, the overcoat layer 150, the optical sheet 200, the support frame 400, the display panel 100, and the top case 500 of FIG. 7 are substantially the same as those of FIGS. 1 to 4 described above, respectively.

Figure 8:
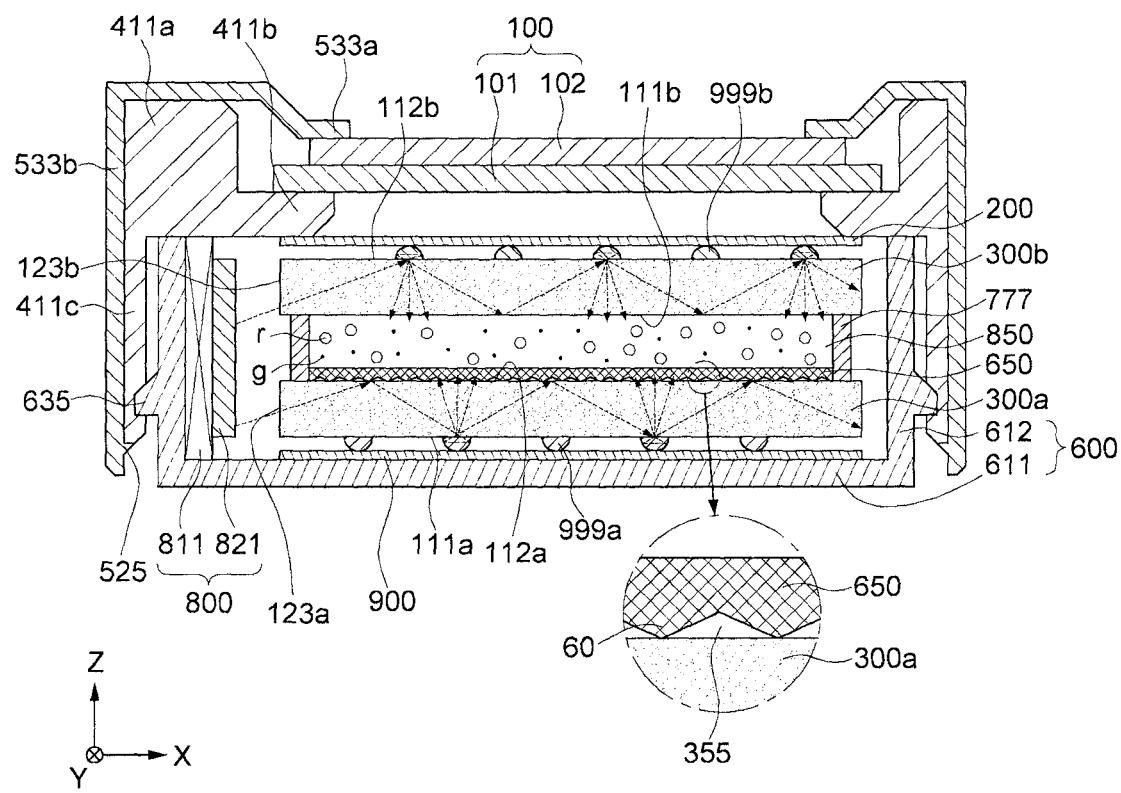
FIG. 8 is a cross-sectional view illustrating a display device according to some example embodiments of the present invention.

FIG. 8 is a cross-sectional view illustrating a display device according to some example embodiments of the present invention. The dotted arrows in FIG. 8 represent the path of light.

As illustrated in FIG. 8, a display device according to some example embodiments of the present invention includes a light source module 800, a bottom case 600, a reflection plate 900, a first light guide plate 300a, a sealing portion 777, a capping layer 650, a color conversion layer 850, a second light guide plate 300b, an optical sheet 200, a support frame 400, a display panel 100, and a top case 500.

The capping layer 650 of FIG. 8 is positioned between the first light guide plate 300a and the color conversion layer 850. One surface of the capping layer 650 has a concave-convex shape or pattern (e.g., comprising a plurality of adjacent convex portions separated by concave portions). In such a case, the one surface of the capping layer 650 refers to a surface of the capping layer 650 that faces the first light guide plate 300a. An air layer 355 is positioned in the space surrounded by adjacent convex portions 60 of the capping layer 650 and the first light guide plate 300a.

The light source module 800, the bottom case 600, the reflection plate 900, the first light guide plate 300a, the first optical pattern 999a, the sealing portion 777, the color conversion layer 850, the second light guide plate 300b, the second optical pattern 999b, the optical sheet 200, the support frame 400, the display panel 100, and the top case 500 of FIG. 8 are substantially the same as those of FIG. 5 described above, respectively.

Figure 9:
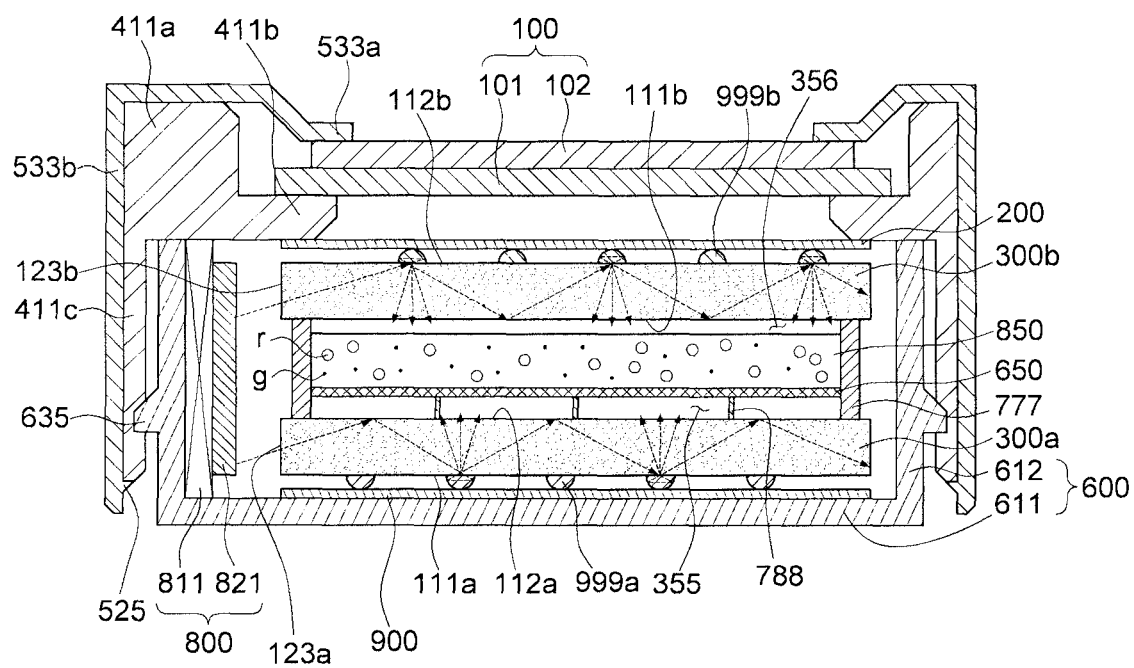
FIG. 9 is a cross-sectional view illustrating a display device according to some example embodiments of the present invention.
Figure 9:
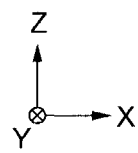

FIG. 9 is a cross-sectional view illustrating a display device according to another embodiment of the present invention. The dotted arrows in FIG. 9 represent the path of light.

As illustrated in FIG. 9, a display device according to some example embodiments of the present invention includes a light source module 800, a bottom case 600, a reflection plate 900, a first light guide plate 300a, a sealing portion 777, a support portion 788, a capping layer 650, a color conversion layer 850, a second light guide plate 300b, an optical sheet 200, a support frame 400, a display panel 100, and a top case 500.

An air layer 356 may be further located between the color conversion layer 850 and the second light guide plate 300b of FIG. 9. To this end, the color conversion layer 850 and the second light guide plate 300b of FIG. 9 may be spaced apart from each other by a distance (e.g., a predetermined distance). In other words, the color conversion layer 850 and the second light guide plate 300b of FIG. 9 may be spaced apart from each other by a distance (e.g., a predetermined distance) so that surfaces thereof that face each other may not contact each other.

The second light guide plate 300b may include or be formed of glass, and the total reflection capability of the second light guide plate 300b may be improved by the air layer 356 described above.

The bottom case 600, the reflection plate 900, the first light guide plate 300a, the first optical pattern 999a, the sealing portion 777, the support portion 788, the color conversion layer 850, the second light guide plate 300b, the second optical pattern 999b, the optical sheet 200, the support frame 400, the display panel 100, and the top case 500 of FIG. 9 are the same as (or substantially the same as) those of FIG. 5 described above, respectively.

Figure 10:
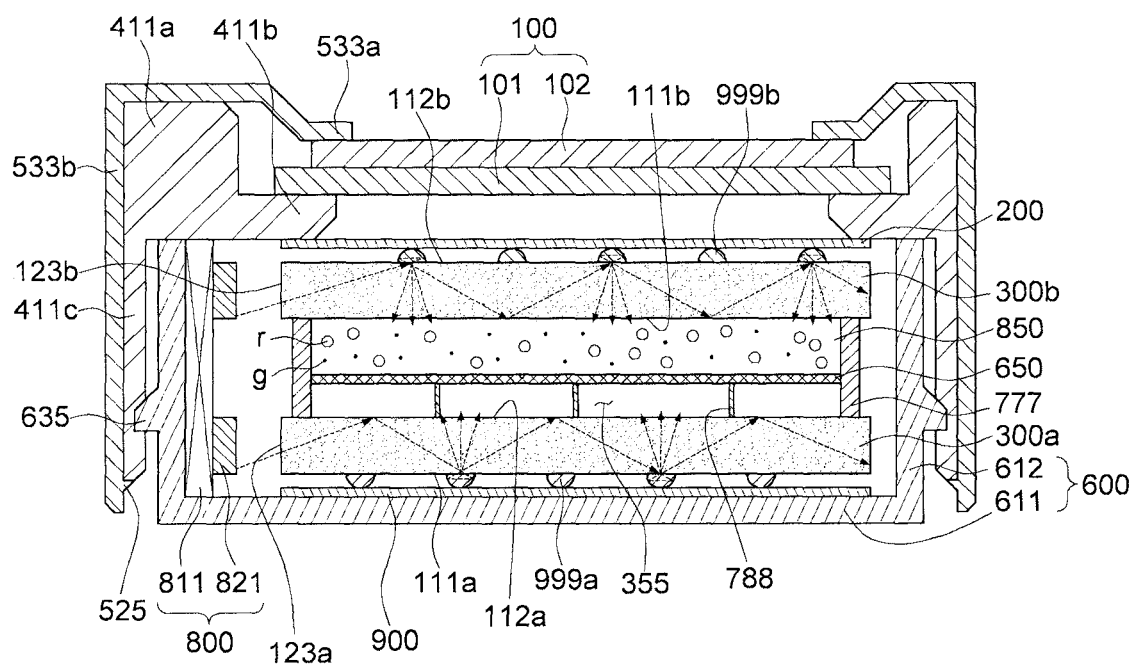
FIG. 10 is a cross-sectional view illustrating a display device according to some example embodiments of the present invention.

FIG. 10 is a cross-sectional view illustrating a display device according to some example embodiments of the present invention. The dotted arrows in FIG. 10 represent the path of light.

As illustrated in FIG. 10, a display device according to some example embodiments of the present invention includes a light source module 800, a bottom case 600, a reflection plate 900, a first light guide plate 300a, a sealing portion 777, a support portion 788, a capping layer 650, a color conversion layer 850, a second light guide plate 300b, an optical sheet 200, a support frame 400, a display panel 100, and a top case 500.

The light source module 800 of FIG. 10 includes at least one first light source 831, at least one second light source 832, and a light source PCB 811.

The first light source 831 faces a first light incidence surface 123a of the first light guide plate 300a. The first light source 831 is the same as (or substantially the same as) the light source 821 of FIG. 1 described above. When the light source module 800 includes the plurality of first light sources 831, the plurality of first light sources 831 are located along the first light incidence surface 123a.

The second light source 832 faces a second light incidence surface 123b of the second light guide plate 300b. The second light source 832 is substantially the same as the light source 821 of FIG. 1 described above. When the light source module 800 includes the plurality of second light sources 832, the plurality of second light sources 832 are located along the second light incidence surface 123b.

The bottom case 600, the reflection plate 900, the first light guide plate 300a, the first optical pattern 999a, the sealing portion 777, the support portion 788, the color conversion layer 850, the second light guide plate 300b, the second optical pattern 999b, the optical sheet 200, the support frame 400, the display panel 100, and the top case 500 of FIG. 10 are the same as (or substantially the same as) those of FIG. 5 described above, respectively.

Figure 11:
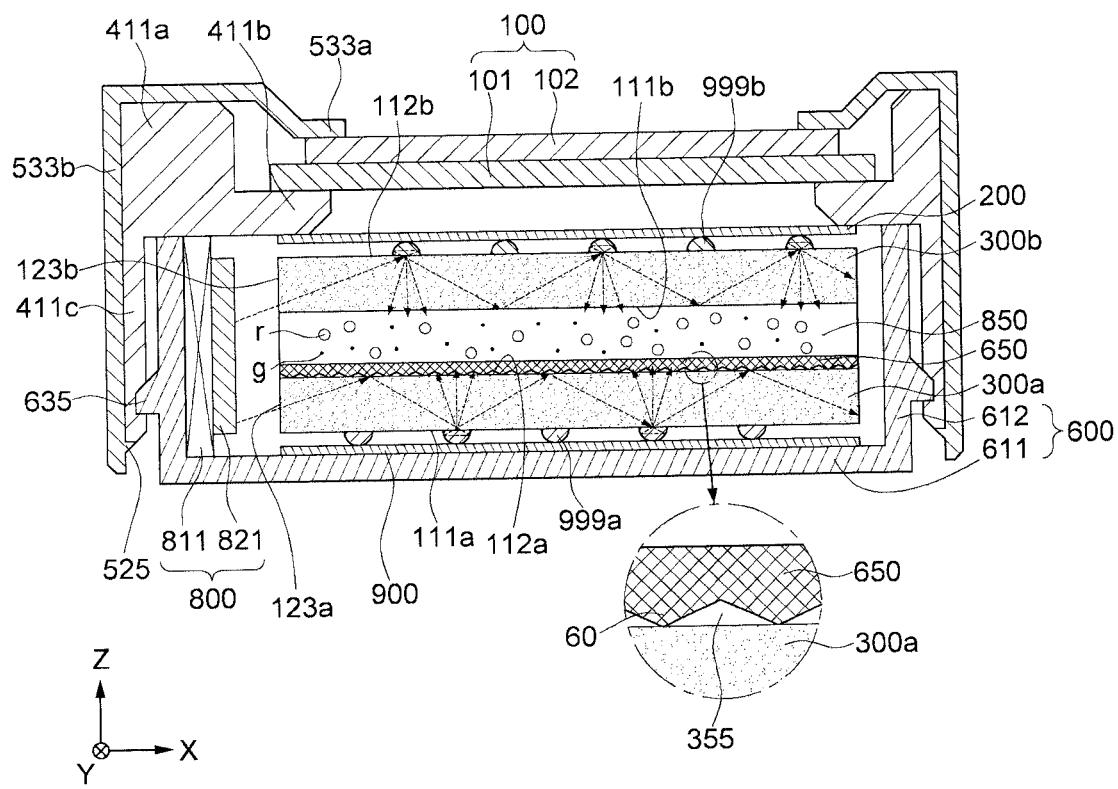
FIG. 11 is a cross-sectional view illustrating a display device according to some example embodiments of the present invention.

FIG. 11 is a cross-sectional view illustrating a display device according to some example embodiments of the present invention. The dotted arrows in FIG. 11 represent the path of light.

As illustrated in FIG. 11, a display device according to some example embodiments of the present invention includes a light source module 800, a bottom case 600, a reflection plate 900, a first light guide plate 300a, a capping layer 650, a color conversion layer 850, a second light guide plate 300b, an optical sheet 200, a support frame 400, a display panel 100, and a top case 500. That is, the display device of FIG. 11 has a structure of the display device of FIG. 8 from which the sealing portion 777 is removed.

The size of the color conversion layer 850 in the X-axis (or Y-axis) direction in FIG. 11 may be the same as (or substantially the same as) the size of the first light guide plate 300a in the X-axis (or Y-axis) direction.

The size of the color conversion layer 850 in the X-axis (or Y-axis) direction in FIG. 11 may be the same as (or substantially the same as) the size of the second light guide plate 300b in the X-axis (or Y-axis) direction.

The light source module 800, the bottom case 600, the reflection plate 900, the first light guide plate 300a, the capping layer 650, the color conversion layer 850, the second light guide plate 300b, the optical sheet 200, the support frame 400, the display panel 100, and the top case 500 of FIG. 11 are the same as (or substantially the same as) those of FIG. 8 described above, respectively.

Figure 12:
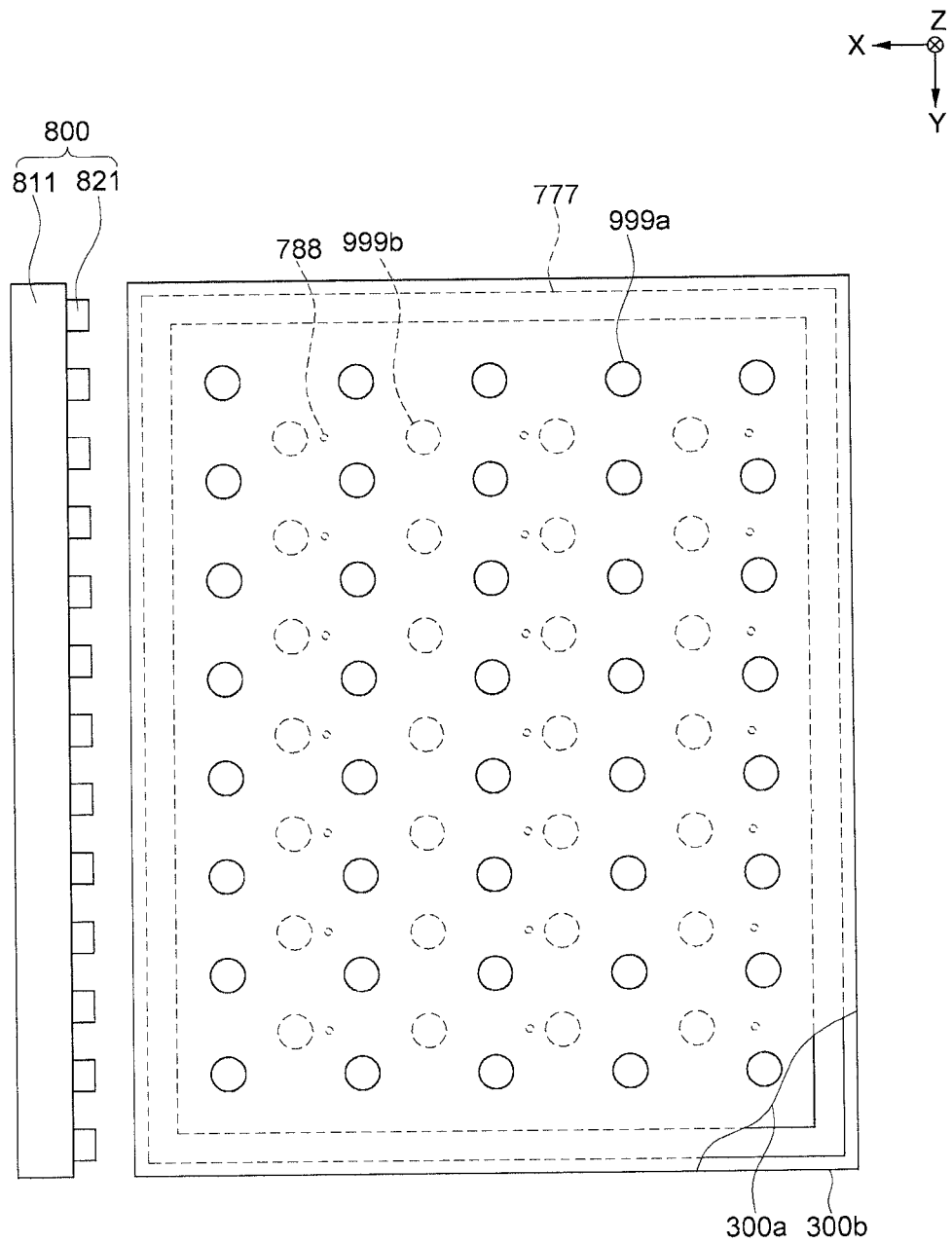
FIG. 12 is a view illustrating the second light guide plate viewed from the first light guide plate of FIG. 2 according to some example embodiments of the present invention.

FIG. 12 is a view illustrating the second light guide plate viewed from the first light guide plate of FIG. 2 according to some example embodiments of the present invention.

As illustrated in FIG. 12, when first optical patterns 999a that are located on each edge portion of the first light guide plate 300a are defined as outer optical patterns, all of the second optical patterns 999b of the second light guide plate 300b are enclosed by the outer optical patterns. For example, imaginary lines connecting center points of adjacent outer optical patterns form a quadrangular shape, and all of the second optical patterns 999b may be positioned within a quadrangular area defined by the imaginary lines.

As illustrated in FIG. 12, the number of the first optical patterns 999a may be larger than the number of the second optical patterns 999b.

The first optical patterns 999a of FIG. 12 may be arranged in a matrix form on the first lower surface 111a of the first light guide plate 300a.

The second optical patterns 999b of FIG. 12 may be arranged in a matrix form on the second lower surface 111b or the second upper surface 112b of the second light guide plate 300b.

As described above, the second optical pattern 999b does not overlap the first optical pattern 999a. For example, the second optical pattern 999b does not overlap the first optical pattern 999a with respect to the Z-axis direction.

The first and second light guide plates 300a and 300b of FIG. 12 may be applied to all the embodiments described above. In some example embodiments, the light source module 800 included in the display devices of FIGS. 2 to 9 may be replaced with the light source module 800 of FIG. 10.

As set forth hereinabove, the display device according to some example embodiments of the present invention may include at least the following characteristics.

First, the display device according to some example embodiments of the present invention includes a first optical pattern and a second optical pattern which do not overlap each other. Accordingly, the total reflection capability and the light condensing capability of the light guide plate may be improved.

Second, the display device according to some example embodiments of the present invention includes an air layer positioned between two light guide plates. Accordingly, the total reflection capability of the light guide plates may be improved. Accordingly, uniform light may be provided to the display panel.

Third, the low refractive index layer may be omitted due to the aforementioned air layer. Accordingly, the manufacturing process of the display device may be simplified.

Fourth, the display device according to some example embodiments of the present invention includes the color conversion layer positioned in a space isolated by the two light guide plates and the sealing portion. Accordingly, foreign substances such as moisture may be prevented (or substantially prevented) from penetrating into the color conversion layer.

While the present invention has been illustrated and described with reference to the exemplary embodiments thereof, it will be apparent to those of ordinary skill in the art that various changes in form and detail may be formed thereto without departing from the spirit and scope of the present invention, as defined in the following claims and their equivalents.

What is claimed is:

1. A display device comprising:
a first light guide plate and a display panel disposed along a first direction;
a second light guide plate between the first light guide plate and the display panel to be spaced apart from the first light guide plate;
a light source at at least one of one side of the first light guide plate and one side of the second light guide plate;
at least one first optical pattern on one of surfaces of the first light guide plate that face each other along the first direction;
at least one second optical pattern on one of surfaces of the second light guide plate that face each other along the first direction; and
a sealing portion disposed along an edge of the first light guide plate, between the first light guide plate and the second guide plate,
wherein none of the at least one first optical pattern overlap the second optical pattern,
wherein the sealing portion has a closed loop shape surrounding a center of the first light guide plate,
wherein a space is defined by the first light guide plate, the second guide plate and the sealing portion.

2. The display device of claim 1, wherein the first optical pattern is on a surface of the first light guide plate that is further away from the second light guide plate.

3. The display device of claim 2, wherein the second optical pattern is on a surface of the second light guide plate that is closer to the first light guide plate.

4. The display device of claim 1, further comprising a sealing portion disposed along an edge of the first light guide plate, between the first light guide plate and the second light guide plate.

5. The display device of claim 4, wherein an air layer is in a space surrounded by the first light guide plate, the second light guide plate, and the sealing portion.

6. The display device of claim 1, further comprising a support portion between the first light guide plate and the second light guide plate.

7. The display device of claim 3, wherein the second optical pattern contacts the second light guide plate.

8. The display device of claim 3, further comprising a color conversion layer between the second light guide plate and the display panel.

9. The display device of claim 2, wherein the second optical pattern is on one of the surfaces of the second light guide plate that is further away from the first light guide plate.

10. The display device of claim 9, further comprising a color conversion layer between the first light guide plate and the second light guide plate.

11. The display device of claim 10, further comprising a capping layer between the first light guide plate and the color conversion layer.

12. The display device of claim 11, wherein one surface of the capping layer that faces the first light guide plate has a concave-convex shape.

13. The display device of claim 12, wherein an air layer is positioned in a space surrounded by convex portions of the concave-convex shape and the second light guide plate.

14. The display device of claim 10,
wherein an air layer is in a space surrounded by the color conversion layer, the second light guide plate, and the sealing portion.

15. The display device of claim 11, further comprising a support portion between the second light guide plate and the capping layer.

16. The display device of claim 4, wherein the sealing portion comprises a transparent material.

17. The display device of claim 6, wherein the support portion comprises a transparent material.

18. The display device of claim 1, wherein second light guide plate has a thickness less than a thickness of the first light guide plate.

19. The display device of claim 1, wherein the light source faces a light incidence surface of the first light guide plate, faces a light incidence surface of the second light guide plate, and faces between the first light guide plate and the second light guide plate.

20. The display device of claim 1, wherein the light source faces a light incidence surface of the first light guide plate.

21. The display device of claim 1, wherein the light source comprises:
a first light source facing a light incidence surface of the first light guide plate; and
a second light source facing a light incidence surface of the second light guide plate.

22. The display device of claim 1, wherein the light source faces a light incidence surface at a side of the first light guide plate and facing a light incidence surface at a side of the second light guide plate, such that the light source extends from the first light guide plate to the second light guide plate along the first direction.

23. The display device of claim 1, wherein the first light guide plate is parallel to a plane defined by a second direction and a third direction that are perpendicular to the first direction, and wherein the light source overlaps the first light guide plate and the second light guide plate along at least one of the second direction or the third direction.

24. The display device of claim 1, wherein the light source overlaps the first light guide plate and the second light guide plate along at least one of the second direction or the third direction.

25. A display device comprising:
a first light guide plate and a display panel disposed along a first direction;
a second light guide plate between the first light guide plate and the display panel;
a light source at at least one of one side of the first light guide plate and one side of the second light guide plate;
a color conversion layer between the first light guide plate and the second light guide plate, and
a sealing portion disposed along an edge of the first light guide plate, between the first light guide plate and the second guide plate,
wherein the sealing portion has a closed loop shape surrounding a center of the first light guide plate,
wherein a space is defined by the first light guide plate, the second guide plate and the sealing portion.

26. The display device of claim 25, further comprising:
at least one first optical pattern on one of surfaces of the first light guide plate that face each other along the first direction; and
at least one second optical pattern on one of surfaces of the second light guide plate that face each other along the first direction.

27. The display device of claim 26, wherein the first optical pattern and the second optical pattern do not overlap each other.

* * * * *